United States Patent [19]

Olson et al.

[11] Patent Number: 4,515,931
[45] Date of Patent: May 7, 1985

[54] POLYFUNCTIONAL ACRYLATE MONOMERS AND POLYMERS THEREOF USEFUL AS CAPACITOR DIELECTRICS

[75] Inventors: Daniel R. Olson; Timothy W. O'Donnell, both of Schenectady, N.Y.

[73] Assignee: General Electric Company, Schenectady, N.Y.

[21] Appl. No.: 562,894

[22] Filed: Dec. 19, 1983

[51] Int. Cl.³ .................... C08F 20/20; C07F 69/54
[52] U.S. Cl. .................... 526/323.2; 526/321; 526/323.1; 252/182; 252/579; 560/220; 560/224
[58] Field of Search ............ 252/182, 579; 526/321, 526/323.1, 323.2; 560/220, 224

[56] References Cited

U.S. PATENT DOCUMENTS

| | | | |
|---|---|---|---|
| 2,755,303 | 7/1956 | Schnell et al. | 560/224 |
| 3,442,934 | 5/1969 | Pine | 560/224 |
| 4,187,383 | 2/1980 | Cowherd, III et al. | 560/224 |
| 4,410,644 | 10/1983 | Bunyan | 526/323.1 |
| 4,423,818 | 1/1981 | Rogier | 560/224 |

Primary Examiner—Paul Lieberman
Assistant Examiner—Robert A. Wax
Attorney, Agent, or Firm—William H. Pittman; James C. Davis, Jr.; James Magee, Jr.

[57] ABSTRACT

Compositions comprising polyfunctional acrylate monomers of the formula

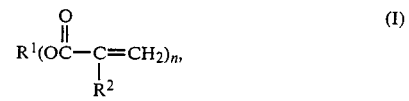

wherein $R^1$ is an aliphatic or alicyclic radical having about 20–40 carbon atoms, $R^2$ is hydrogen or methyl, and n is from 2 to 4, at least about 40% of said monomers containing alicyclic $R^1$ moieties, may be polymerized to form polymers useful as dielectrics for capacitors. Illustrative polyfunctional acrylates are those prepared from a diol which is the reduction product of linoleic acid dimer, or from condensation products of fatty acids such as linoleic acid with such materials as acrylic acid.

8 Claims, No Drawings

POLYFUNCTIONAL ACRYLATE MONOMERS AND POLYMERS THEREOF USEFUL AS CAPACITOR DIELECTRICS

This invention relates to new monomeric compositions of matter and polymers thereof, said polymers being useful for a number of purposes including the formulation of dielectrics. In their broadest definition, the monomers of this invention comprise at least one polyfunctional acrylate having the formula

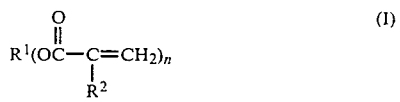

wherein $R^1$ is an aliphatic or alicyclic radical having about 20–40 carbon atoms which optionally contains up to about three non-conjugated olefinic linkages, $R^2$ is hydrogen or methyl, and n is from 2 to 4; at least about 40% of said polyfunctional acrylates containing alicyclic $R^1$ moieties.

Capacitors are used in a wide variety of electrical circuits, for example in relatively high voltage AC power systems (such as the common 110-volt systems) and in relatively low voltage (e.g., under 50 volts) DC systems frequently encountered in printed circuits and the like. Important factors which must be considered in the manufacture of such capacitors are efficiency, temperature of operation, dissipation factor and behavior upon failure.

Efficiency is normally measured in terms of capacitance per unit volume. High efficiency is desirable, with values of at least 50 microfarads per cubic inch being preferred. Operating temperature and dissipation factor are related since many capacitors, especially operating at relatively high temperatures, function inadequately because they dissipate their electrical energy as heat.

Finally, the behavior of a capacitor upon failure may be a critical factor in the operation of the circuit in which the capacitor is used. Upon failure of a ceramic capacitor, for example, the circuit is not broken and surges in voltage and/or current may cause damage to other components therein. It is desirable that breakage of the circuit occur when a capacitor fails, thereby preventing such damage.

In copending, commonly assigned applications Ser. No. 562,779, filed Dec. 19, 1983, and Ser. No. 620,647, filed June 14, 1984, there is disclosed a novel multilayer capacitor structure having particularly advantageous properties with respect to these and other criteria. This structure comprises successive conductive layers which are offset so as to define a central capacitance region of stacked isolated extending layers, a coating of dielectric deposited on each said layers so that the layers in the capacitance region are substantially spaced and separated by said coating of dielectric, the deposition of said coating being controlled so as to slope toward cutoff lines spaced substantially from two separated portions of the central capacitor region, said conductive layers extending beyond said cutoff lines so that successive layers fuse into spaced apart terminal portions, and said cutoff line spacing being sufficient to cause the uppermost dielectric coating of the capacitor to have a horizontal dimension from the capacitor region to the terminal portion to accept a final layer deposition. Most often, said capacitors contain at least 100 dielectric-coated electrode layers. Copending, commonly assigned application Ser. No. 562,873, filed Dec. 19, 1983, discloses a wide variety of polyfunctional acrylate polymers useful as dielectrics in these and other capacitors. The disclosures of both of the aforementioned applications are incorporated by reference herein.

A principal object of the present invention is to provide novel polyfunctional acrylate monomers and polymers thereof.

A further object is to provide polyfunctional acrylates which, upon polymerization, yield materials suitable for use as dielectrics.

Another object is to provide polymeric dielectric materials useful in thin film capacitors.

Still another object is to provide monomers which are easy to deposit as thin films, said films being subsequently polymerizable by irradiation or the like to form layers useful as dielectrics in thin film capacitors.

Other objects will in part be obvious and will in part appear hereinafter.

As will be apparent from formula I, the monomeric compositions of this invention comprise di-, tri- or tetraacrylates and methacrylates, preferably acrylates, derived from at least one polyhydroxy compound of the formula $R^1(OH)_n$. The radical $R^1$ may be aliphatic or alicyclic; it may optionally contain up to about three non-conjugated olefinic linkages, and contains about 20–40 carbon atoms.

At least about 40%, and preferably at least about 50%, of the total number of polyfunctional acrylate species in said compositions contain alicyclic $R^1$ radicals. Thus, said compositions may be polyfunctional acrylates derived entirely from alicyclic polyhydroxy compounds or may be derived from mixtures of acyclic and alicyclic polyhydroxy compounds satisfying these percentage limitations.

It is frequently convenient to prepare the polyhydroxy compound $R^1(OH)_n$ by reduction of at least one corresponding polycarboxylic acid or ester thereof, which may be saturated or may contain olefinic linkages. A typical suitable polycarboxylic acid is linoleic acid dimer (hereinafter "dimer acid"), a mixture consisting essentially of acyclic, monocyclic and bicyclic dicarboxylic acids which typically contain up to two olefinic bonds per molecule. A particularly suitable dimer acid is sold by Emery Industries under the trade designation "Empol 1010". According to Kirk-Othmer, *Encyclopedia of Chemical Technology*, Third Edition, Volume 7, pp. 768–770, the following are structures of typical molecular species present in the methyl ester of dimer acid:

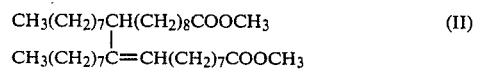

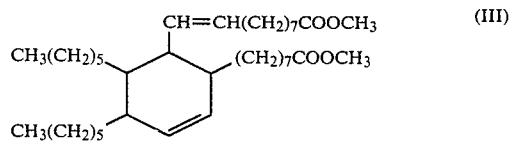

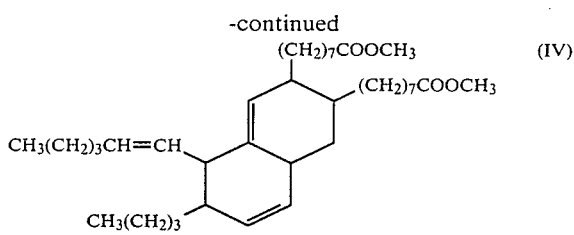

Thus, free dimer acid obviously comprises free dicarboxylic acids having corresponding structures.

The esters of formulas II, III and IV, their corresponding free acids, and similar polycarboxylic acids and esters may be reduced by known methods, such as by hydrogen in the presence of a hydrogenation catalyst or by lithium aluminum hydride, to produce diols useful for preparation of the polyfunctional acrylates of this invention. Depending on the method of reduction of these or similar acids or esters, the reduction product may be saturated or may contain olefinic linkages. For example, lithium aluminum hydride reduction normally will not affect olefinic linkages while some hydrogenation methods (e.g., in the presence of a palladium catalyst) will reduce them to saturated linkages. Thus, reduction of compounds II, III and IV may produce diols of the respective formulas $$CH_3(CH_2)_7CH(CH_2)_8CH_2OH \quad (V)$$
$$CH_3(CH_2)_7C\overset{[}{-}\overset{]}{-}CH(CH_2)_7CH_2OH$$

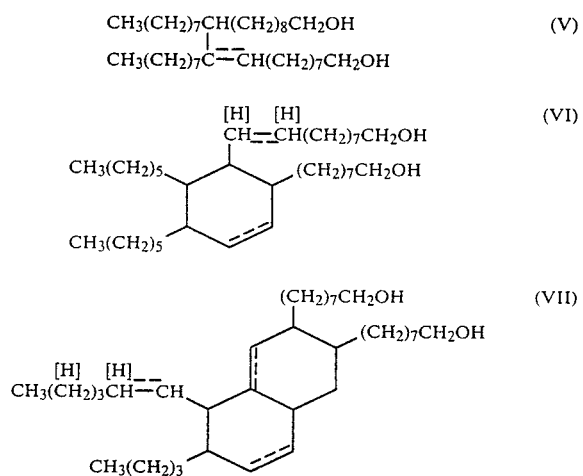

wherein the broken lines and hydrogen atoms in brackets indicate that the corresponding carbon-carbon bonds may be single or double bonds depending on the method of reduction. It is frequently found that the compounds of this invention which contain only single bonds have properties somewhat more favorable than those of the analogous double-bonded compounds. Suitable diol mixtures of this type are commercially available from Henkel Corporation under the trade name "Dimerol".

Another class of suitable polyhydroxy compounds may be prepared by reduction of various acrylic acid-unsaturated fatty acid condensation products. These polyhydroxy compounds may be illustrated by the formula

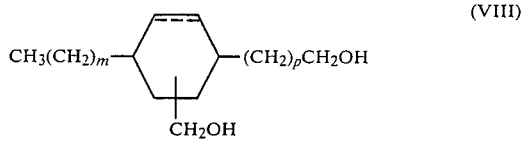

wherein m may be, for example, from 3 to 5, p may be from 7 to 9 and the sum of m and p is 12. A typical commercially available dicarboxylic acid which may be reduced to a diol of formula VIII is sold under the trade designation "Westvaco 1550 Diacid"; it has the formula

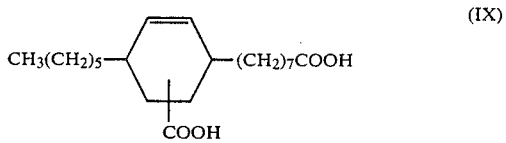

and is an adduct of linoleic and acrylic acids. It is also described in Kirk-Othmer, op. cit, at p. 779.

The polyfunctional acrylates may be easily prepared by esterification of the above-described polyhydroxy compounds with acrylic or methacrylic acid using known reaction procedures. Thus, the acid and alcohol may typically be reacted in a suitable solvent, in the presence of a small amount of an acidic esterification catalyst such as sulfuric acid, p-toluenesulfonic acid, acidic ion exchange resins or acidified clays. Ordinarily, a stoichiometric excess of the acid is used, the ratio of equivalents of acid to diol typically being between about 2:1 to about 4:1. The reaction is ordinarily carried out at about 100°–200° C., most often about 100°–150° C. It is often preferred to incorporate in the esterification mixture a minor amount of a polymerization inhibitor such as p-methoxyphenol, 2,6-di-t-butylphenol or 2,4,6-tri-t-butylphenol. The acrylic or methacrylic acid may be replaced by a functional derivative thereof such as an acyl halide, lower alkyl ester or amide, with suitable modification of the reaction conditions.

The preparation of the polyfunctional acrylates of this invention is illustrated by the following examples.

EXAMPLE 1

To a solution of 96 grams (2.5 moles) of lithium aluminum hydride in 3000 ml. of tetrahydrofuran was added dropwise, with stirring, 400 grams (0.71 mole) of "Empol 1010" dimer acid. The mixture was heated under reflux for about 40 hours and then neutralized by the sequential addition of 96 ml. of water, 96 ml. of 15 percent aqueous sodium hydroxide solution, and 288 ml. of water. The neutralized mixture was filtered and the solvent was evaporated from the filtrate to yield the desired diol.

A solution of 200 grams (0.37 mole) of the diol, 157 ml. (2.24 moles) of acrylic acid, 3 grams of p-toluenesulfonic acid and 0.5 gram of p-methoxyphenol in 1000 ml. of toluene was heated under reflux as water was removed by azeotropic distillation. When the stoichiometric amount of water (about 13.3 ml.) had been removed, the solution was cooled, filtered and washed several times with dilute potassium carbonate solution and once with dilute sodium chloride solution. It was then dried over magnesium sulfate and the solvent was evaporated to afford the desired diacrylate as a liquid.

EXAMPLE 2

Following the procedure of Example 1, "Westvaco 1550 Diacid" was reduced by lithium aluminum hydride in tetrahydrofuran to a diol having formula VIII in which m is 5, p is 7 and the broken line indicates a double bond. This diol (85 grams, 0.25 mole) was reacted with acrylic acid (90 ml., 1.28 mole) in toluene solution to yield the desired diacylate as a liquid.

EXAMPLE 3

Following a procedure similar to that of Example 1, a liquid diacrylate was prepared from a commercially available diol which was in turn prepared by hydrogenation of a methyl ester of linoleic acid dimer, and whose principal components have formulas V, VI and VII wherein the broken lines represent predominantly single bonds.

The polyfunctional acrylates of this invention may be polymerized under free-radical conditions, either alone or in the presence of other monomers. The term "polymer," as used herein, includes addition homopolymers and copolymers with one or more other monomers.

Polymerization by the free-radical method may be effected in bulk, solution, suspension or emulsion, by contacting the monomer or monomers with a polymerization initiator either in the absence or presence of a diluent at a temperature of about 0°–200° C. Suitable initiators include benzoyl peroxide, tertiary butyl hydroperoxide, acetyl peroxide, hydrogen peroxide, azobisisobutyronitrile, persulfate-bisulfite, persulfate-sodium formaldehyde sulfoxylate, chlorate-sulfite and the like. Alternatively, polymerization may be effected by irradiation techniques, as by ultraviolet, electron beam or plasma irradiation.

A large variety of polymerizable compounds can be used to form copolymers with the polyfunctional acrylates of this invention. They include the following:

1. Unsaturated alcohols and esters thereof: Allyl, methallyl, crotyl, 1-chloroallyl, 2-chloroallyl, cinnamyl, vinyl, methylvinyl, 1-phenallyl and butenyl alcohols, and esters of such alcohols with saturated acids such as acetic, propionic, butyric, valeric, caproic and stearic; with unsaturated acids such as acrylic, α-substituted acrylic (including alkylacrylic, e.g., methacrylic, ethylacrylic, propylacrylic, etc., and arylacrylic such as phenylacrylic), crotonic, oleic, linoleic and linolenic; with polybasic acids such as oxalic, malonic, succinic, glutaric, adipic, pimelic, suberic, azelaic and sebacic; with unsaturated polybasic acids such as maleic, fumaric, citraconic, mesaconic, itaconic, methylenemalonic, acetylenedicarboxylic and aconitic; and with aromatic acids, e.g, benzoic, phenylacetic, phthalic, terephthalic and benzoylphthalic acids.

2. Unsaturated acids (examples of which appear above) and esters thereof with lower saturated alcohols, such as methyl, ethyl, propyl, isopropyl, butyl, isobutyl, sec-butyl, tert-butyl, 2-ethylhexyl and cyclohexyl alcohols, and with saturated lower polyhydric alcohols such as ethylene glycol, propylene glycol, tetramethylene glycol, neopentyl glycol and trimethylolpropane.

3. Unsaturated lower polyhydric alcohols, e.g., butenediol, and esters thereof with saturated and unsaturated aliphatic and aromatic, monobasic and polybasic acids, examples of which appear above.

4. Esters of the above-described unsaturated acids, especially acrylic and methacrylic acids, with higher molecular weight monohydroxy and polyhydroxy materials such as decyl alcohol, isodecyl alcohol, oleyl alcohol, stearyl alcohol, epoxy resins and polybutadiene-derived polyols.

5. Vinyl cyclic compounds including styrene, o-, m-, p-chlorostyrene, bromostyrenes, fluorostyrenes, methylstyrenes, ethylstyrenes and cyanostyrenes; di-, tri-, and tetrachlorostyrenes, bromostyrenes, fluorostyrenes, methylstyrenes, ethylstyrenes, cyanostyrenes; vinylnaphthalene, vinylcyclohexane, divinylbenzene, trivinylbenzene, allylbenzene, and heterocycles such as vinylfuran, vinylpridine, vinylbenzofuran, N-vinylcarbazole, N-vinylpyrrolidone and N-vinyloxazolidone.

6. Unsaturated ethers such as methyl vinyl ether, ethyl vinyl ether, cyclohexyl vinyl ether, octyl vinyl ether, diallyl ether, ethyl methallyl ether and allyl ethyl ether.

7. Unsaturated ketones, e.g., methyl vinyl ketone and ethyl vinyl ketone.

8. Unsaturated amides, such as acrylamide, methacrylamide, N-methylacrylamide, N-phenylacrylamide, N-allylacrylamide, N-methylolacrylamide, N-allylcaprolactam, diacetone acrylamide, hydroxymetholated diacetone acrylamide and 2-acrylamido-2-methylpropanesulfonic acid.

9. Unsaturated aliphatic hydrocarbons, for instance, ethylene, propylene, butenes, butadiene, isoprene, 2-chlorobutadiene and α-olefins in general.

10. Unsaturated alkyl halides, e.g., vinyl fluoride, vinyl chloride, vinyl bromide, vinylidene chloride, vinylidene bromide, allyl chloride and allyl bromide.

11. Unsaturated acid anhydrides, e.g., maleic, citraconic, itaconic, cis-4-cyclohexene-1,2-dicarboxylic and bicyclo(2.2.1)-5-heptene-2,3-dicarboxylic anhydrides.

12. Unsaturated acid halides such as cinnamyl acrylyl, methacrylyl, crotonyl, oleyl and fumaryl chlorides or bromides.

13. Unsaturated nitriles, e.g., acrylonitrile, methacrylonitrile and other substituted acrylonitriles.

By virtue of their polyfunctionality, the monomers of this invention form crosslinked polymers. Thus, they are adapted to the production of heat-resistant polymeric films.

The polymers of this invention are useful, for example, in the preparation of corrosion-resistant coatings and as ingredients for printing inks. They are also useful as insulating materials in certain electrical applications; for example, as potting compositions and as encapsulation resins.

A principal utility of the polymers of this invention, as previously mentioned, is as dielectric compositions in capacitors. The polymers are very useful in this respect because of their adaptability to the production of capacitors with high efficiency and with low dissipation factors. Such capacitors are disclosed and claimed in co-pending, commonly assigned application Ser. No. 562,871, filed Dec. 19, 1983.

The electrodes in the capacitors may be formed of materials and in configurations known in the art. Typical conductive materials are aluminum, copper, zinc, tin, stainless steel and alloys thereof, with aluminum being preferred.

A preferred subgenus of the polymers of this invention from the standpoint of use as dielectric members for capacitors consists of polymers in which all of the units are derived from polyfunctional acrylates of formula I, which are especially preferred. Also contemplated are copolymers of said polyfunctional acrylates with other mono- and polyacrylates. Illustrative of suitable monoacrylates are those of higher monohydroxy alcohols such as isodecyl alcohol or of higher monoepoxides, the term "higher" denoting at least 8 carbon atoms. The preferred copolymers, however, are those with other polyfunctional acrylates illustrated by those of such compounds as trimethylolpropane, neopentyl glycol, polybutadiene-derived polyols and polyepoxides. The copolymers are typically prepared from blends comprising about 25–75% by weight of the polyfunctional acrylates of this invention, with the balance being other acrylates.

Capacitors containing the polymers of this invention as dielectrics have particularly advantageous properties, including high efficiency and low dissipation factors, when their configuration is as disclosed and claimed in the above-identified application Ser. Nos. 562,779 and 620,647. Capacitors of this type may be produced by depositing alternating electrode and dielectric layers so as to provide alternate electrode layers with portions projecting from the stack and contacting each other in electrically connected relation.

The particular suitability of the polymers of this invention as capacitor dielectrics is illustrated by the following example.

EXAMPLE 4

Uniform prototype capacitors were produced by drawing down a monomer layer on an aluminum foil substrate, polymerizing said layer by contact with a 10-megarad electron beam, and depositing a metallic aluminum layer thereon. The thickness of the aluminum foil electrode was 12.5 microns, that of the dielectric layer was 3–6 microns and that of the deposited aluminum electrode was 300–500 Angstroms (0.03–0.05 micron). The areas of the prototype capacitors were about 1 square inch. The dissipation factors of the test capacitors were measured at 60 Hz. using an AC bridge. The results of the tests are given in the following table.

| Example | Dissipation factor, % | | |
|---|---|---|---|
| | 30° C. | 90° C. | 130° C. |
| 1 | 0.75 | 0.05 | 0.025 |
| 2 | 0.95 | 0.70 | 1.95 |
| 3 | 1.7 | 0.10 | 0.12 |

EXAMPLE 5

The procedure described in the aforementioned application Ser. Nos. 562,779 and 620,647 was used to prepare a capacitor about 18 mm. in width. The substrate was aluminum foil about 50 microns thick. Alternate dielectric (thickness about 1 micron) and electrode (thickness about 300–500 Angstroms) layers were deposited. The dielectric layers were formed by evaporation of the product of Example 3 at 400° C. and deposition on an electrode surface maintained at 48° C., followed by electron beam-initiated polymerization, and the electrode layers by vapor deposition of aluminum. The finished capacitor contained 200 layers each of dielectric and deposited electrode. The dissipation factor thereof, measured at 100 Hz. over a 30°–130° C. temperature range, varied from a maximum of 2.8% at 30° C. to a minimum of 0.7% at 90°–130° C.

As will be apparent from these results, capacitors containing the polymers of this invention as dielectrics are characterized by versatility of application, typically including extremely low dissipation factors at both high and low temperatures.

What is claimed is:

1. A composition comprising at least one polyfunctional acrylate having the formula

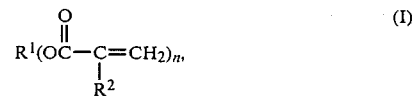

wherein $R^1$ is an aliphatic or alicyclic radical having about 20–40 carbon atoms which contains from 0 up to about three non-conjugated olefinic linkages, $R^2$ is hydrogen or methyl, and n is from 2 to 4; at least about 40% of said polyfunctional acrylates containing alicyclic moieties.

2. A polyfunctional acrylate according to claim 1 wherein $R^2$ is hydrogen.

3. A polyfunctional acrylate according to claim 2 wherein $R^1$ is derived from at least one polyhydroxy compound having the formula $R^1(OH)_n$ which is prepared by reduction of at least one corresponding polycarboxylic acid or ester thereof.

4. A polyfunctional acrylate according to claim 3 wherein the polycarboxylic acid is linoleic acid dimer.

5. A polyfunctional acrylate according to claim 3 wherein the polyhydroxy compound has the formula

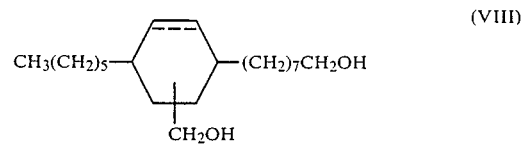

wherein the broken line indicates a single or double bond.

6. An addition polymer of a composition according to claim 1.

7. A polymer according to claim 6 which is a homopolymer or a copolymer with at least one of acrylates of higher monohydroxy alcohols, higher monoepoxides, polyols and polyepoxides.

8. A polymer according to claim 7 in which all of the units are derived from said polyfunctional acrylates.

* * * * *